(12) United States Patent
Park et al.

(10) Patent No.: US 8,699,643 B2
(45) Date of Patent: Apr. 15, 2014

(54) APPARATUS AND METHOD FOR RECEIVING A SIGNAL

(75) Inventors: Chang Soon Park, Chungcheongbuk-Do (KR); Jong Ae Park, Gyeonggi-Do (KR); Sung-Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 13/325,245

(22) Filed: Dec. 14, 2011

(65) Prior Publication Data

US 2012/0163502 A1   Jun. 28, 2012

(30) Foreign Application Priority Data

Dec. 23, 2010   (KR) .......................... 10-2010-0133270

(51) Int. Cl.
*H04L 1/02* (2006.01)
(52) U.S. Cl.
USPC ........................................................ 375/347
(58) Field of Classification Search
USPC .................. 375/259, 262, 267, 316, 340–341, 375/346–347; 455/132, 137
See application file for complete search history.

(56) References Cited

U.S. PATENT DOCUMENTS

| | | | |
|---|---|---|---|
| 6,456,221 B2 * | 9/2002 | Low et al. ...................... 341/157 |
| 7,155,192 B2 | 12/2006 | Ghassemzadeh et al. | |
| 7,403,575 B2 * | 7/2008 | Gehring et al. ............... 375/308 |
| 8,472,507 B2 * | 6/2013 | Sharma ......................... 375/220 |
| 2005/0059431 A1 | 3/2005 | Matsui et al. | |
| 2013/0101013 A1 * | 4/2013 | Kim et al. ..................... 375/239 |

FOREIGN PATENT DOCUMENTS

| | | |
|---|---|---|
| JP | 09-307491 | 11/1997 |
| JP | 2005-094143 | 4/2005 |
| KR | 10-2008-0011823 | 2/2008 |
| KR | 10-2008-0108261 | 12/2008 |
| KR | 10-2010-0068025 | 6/2010 |

\* cited by examiner

*Primary Examiner* — Khanh C Tran
(74) *Attorney, Agent, or Firm* — NSIP Law

(57) ABSTRACT

Provided are an apparatus and method for acquiring a signal to noise ratio (SNR) gain and a diversity gain using multiple antennas for receiving data, and an apparatus for receiving a signal using multiple antennas. The apparatus may receive on-off keying modulated signals through K receiving antennas, detect envelopes with respect to each of the signals received through the K receiving antennas, combine signals generated by performing a linear processing and a nonlinear processing with respect to each of the K detected envelopes, and determine a message value of the on-off keying modulated signals.

21 Claims, 15 Drawing Sheets

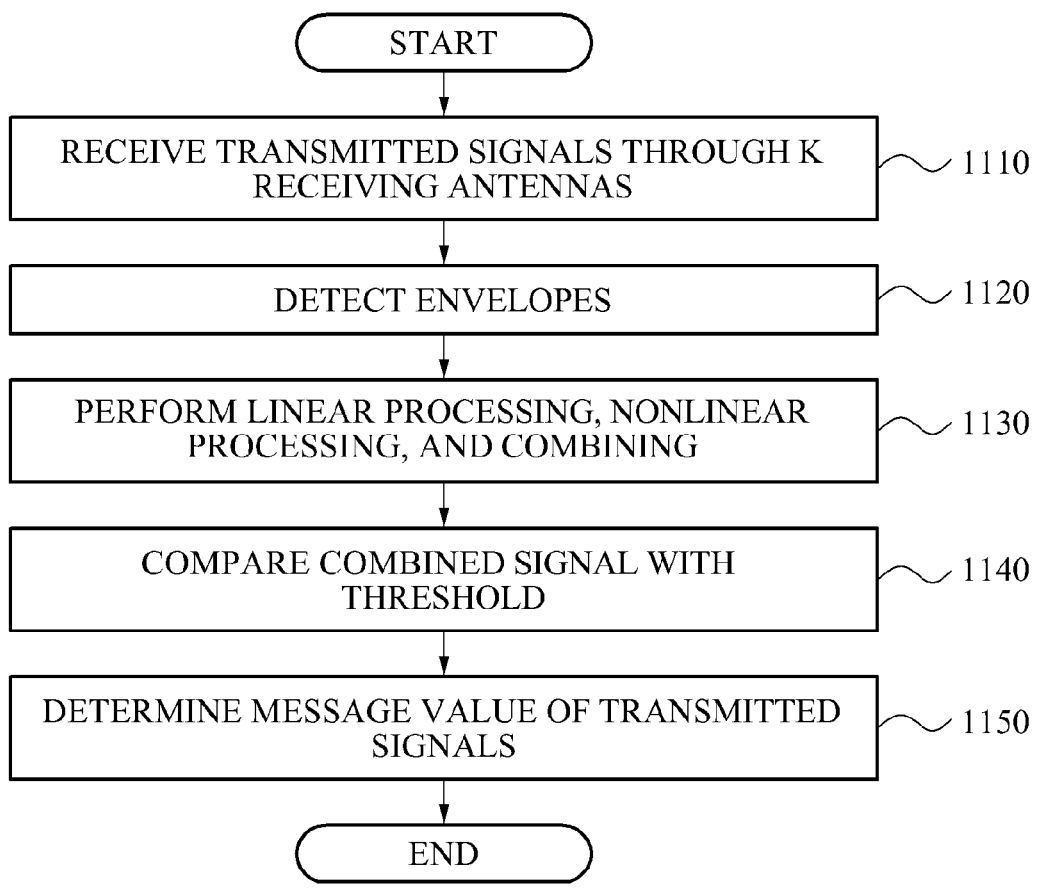

APPARATUS AND METHOD FOR RECEIVING A SIGNAL

CROSS-REFERENCE TO RELATED APPLICATION(S)

This application claims the benefit under 35 U.S.C. §119(a) of Korean Patent Application No. 10-2010-0133270, filed on Dec. 23, 2010, in the Korean Intellectual Property Office, the entire disclosure of which is incorporated herein by reference for all purposes.

BACKGROUND

1. Field

The following description relates to an apparatus and method for acquiring a signal to noise ratio (SNR) gain and a diversity gain using one or more antennas.

2. Description of Related Art

Recently, in a wireless network technology a usage area of a sensor network has been extended. A technology related to the sensor network and a related market has also been extended. A usage area of a wireless sensor network may include various environments such as home security, medical fields, mobile health care, monitoring of a chemical and biological abnormality, diagnosis of a mechanical abnormality and malfunction, monitoring of an environment, sensing of information associated with a disaster, intelligent distribution management, real time security, remote monitoring, and the like.

The size of a sensor may be relatively small in various wireless sensor networks and local area networks. To operate a large number of sensors over a relatively long period of time, conditions of a low power and low complexity are needed. For example, a wireless body area network (WBAN) in which sensors are installed in a human body, may need to meet more rigorous standards of low power and low complexity to perform wireless communication with a neighboring mobile device and with another sensor in the human body.

Due to the rigorous standards, a receiving performance of transmitted data may be limited, and a communication distance between a transmitter and a receiver may be limited to several meters or to tens of meters.

SUMMARY

In one general aspect, there is provided an apparatus for receiving a signal using multiple antennas, the apparatus including a receiver to receive on-off keying modulated signals through K receiving antennas, a detector to detect envelopes with respect to each of the signals that are received through the K receiving antennas, a combiner to combine signals that are generated by performing a linear processing and a nonlinear processing on each of the K detected envelopes, and a message determining unit to determine a message value of the on-off keying modulated signals by comparing the combined signals with a threshold that is determined based on a status of a channel through which the on-off keying modulated signals are transmitted, the K receiving antennas, and a system parameter.

The detector may be configured to detect the envelopes based on a value that is generated by multiplying each of the signals received through the K receiving antennas by two orthogonal functions.

The combiner may comprise a first linear processing unit to square each of the K detected envelopes, and a second linear processing unit to combine the K squared signals, and to perform a square root process with respect to the combined signals.

The combiner may comprise a first linear processing unit to multiply each of the K detected envelopes by a linear parameter that is based on a size of the detected envelopes when a transmission bit corresponds to "1," and that is based on a mean value of squares of the detected envelopes when the transmission bit corresponds to "0", a nonlinear processing unit to perform a logarithmic process with respect to each of the K detected envelopes, and a second linear processing unit to combine signals in which the linear parameter is multiplied and signals in which the logarithmic process is performed.

The combiner may comprise a first linear processing unit to multiply each of the K detected envelopes by a linear parameter that is based on a size of the detected envelopes when a transmission bit corresponds to "1," and that is based on a mean value of squares of the detected envelopes when the transmission bit corresponds to "0", a nonlinear processing unit to perform a logarithmic process with respect to each of signals in which the linear parameter is multiplied, and a second linear processing unit to combine signals in which the linear parameter is multiplied and signals in which the logarithmic process is performed.

The message determining unit may comprise a threshold determining unit to determine an optimal threshold based on a Rayleigh probability density function of the combined signal when a transmission bit corresponds to "0," and based on a Rician probability density function of the combined signal when the transmission bit corresponds to "1", and a transmission bit estimating unit to estimate a transmission bit by comparing the combined signal with the optimal threshold.

The threshold determining unit may be configured to determine the optimal threshold based on a high signal to noise ratio (SNR) region.

The threshold determining unit may be configured to determine the optimal threshold based on a low SNR region.

The threshold determining unit may be configured to determine a reference SNR for determining one of a threshold of a high SNR region and a threshold of a low SNR region.

The threshold determining unit may be configured to determine the threshold of the high SNR region as the optimal threshold when an SNR of the combined signal is greater than or equal to the reference SNR, and the threshold determining unit may be configured to determine the threshold of the low SNR region as the optimal threshold when the SNR of the combined signal is less than the reference SNR.

In another aspect, there is provided a method of receiving a signal using multiple antennas, the method including receiving on-off keying modulated signals through K receiving antennas, detecting envelopes with respect to each of the signals received through the K receiving antennas, combining signals generated by performing a linear processing and a nonlinear processing with respect to each of the K detected envelopes, and determining a message value of the on-off keying modulated signals by comparing a combined signal with a threshold that is determined based the K receiving antennas, a system parameter, and a status of a channel through which the on-off keying modulated signals are transmitted.

The combining may comprise squaring each of the K detected envelopes, and combining the K squared signals into a single signal.

The combining may comprise multiplying each of the K detected envelopes by a linear parameter that is based on a size of the detected envelopes when a transmission bit corresponds to "1," and that is based on a mean value of squares of the detected envelopes when the transmission bit corresponds to "0", performing a logarithmic process with respect to each of the K detected envelopes, and combining signals in which the linear parameter is multiplied and signals in which the logarithmic process is performed.

The combining may comprise multiplying each of the K detected envelopes by a linear parameter that is based on a size of the detected envelopes when a transmission bit corresponds to "1," and that is based on a mean value of squares of the detected envelopes when the transmission bit corresponds to "0", performing a logarithmic process with respect to each of signals in which the linear parameter is multiplied, and combining signals in which the linear parameter is multiplied and signals in which the logarithmic process is performed.

The determining may comprise determining an optimal threshold based on a Rayleigh probability density function of the combined signal when a transmission bit corresponds to "0" and based on a Rician probability density function of the combined signal when the transmission bit corresponds to "1", and estimating a transmission bit by comparing the combined signal with the optimal threshold.

The determining of the threshold may comprise determining, as the optimal threshold, half of a magnitude of a signal component neglecting noise in the combined signal.

The determining of the threshold may comprise determining the optimal threshold based on a high signal to noise ratio (SNR) region.

The determining of the threshold may comprise determining the optimal threshold based on a low SNR region.

The determining of the threshold may comprise determining a reference SNR for determining one of a threshold of a high SNR region and a threshold of a low SNR region.

When an SNR of the combined signal is greater than or equal to the reference SNR, the determining of the threshold may comprise determining the threshold of the high SNR region as the optimal threshold, and when the SNR of the combined signal is less than the reference SNR, the determining of the threshold may comprise determining the threshold of the low SNR region as the optimal threshold.

In another aspect, there is provided a terminal comprising K antennas each for receiving a signal, the terminal including a detector to detect envelopes of K signals that are received through each of the K receiving antennas, a combiner to combine each of the K signals by performing a linear processing and a nonlinear processing on each of the K detected envelopes, and a message determining unit to determine a message value of the on-off keying modulated signals based on the combined signals.

Other features and aspects may be apparent from the following detailed description, the drawings, and the claims.

BRIEF DESCRIPTION OF THE DRAWINGS

FIG. 11 is a flowchart illustrating an example of a method for receiving a signal using multiple antennas.

Figure 1:
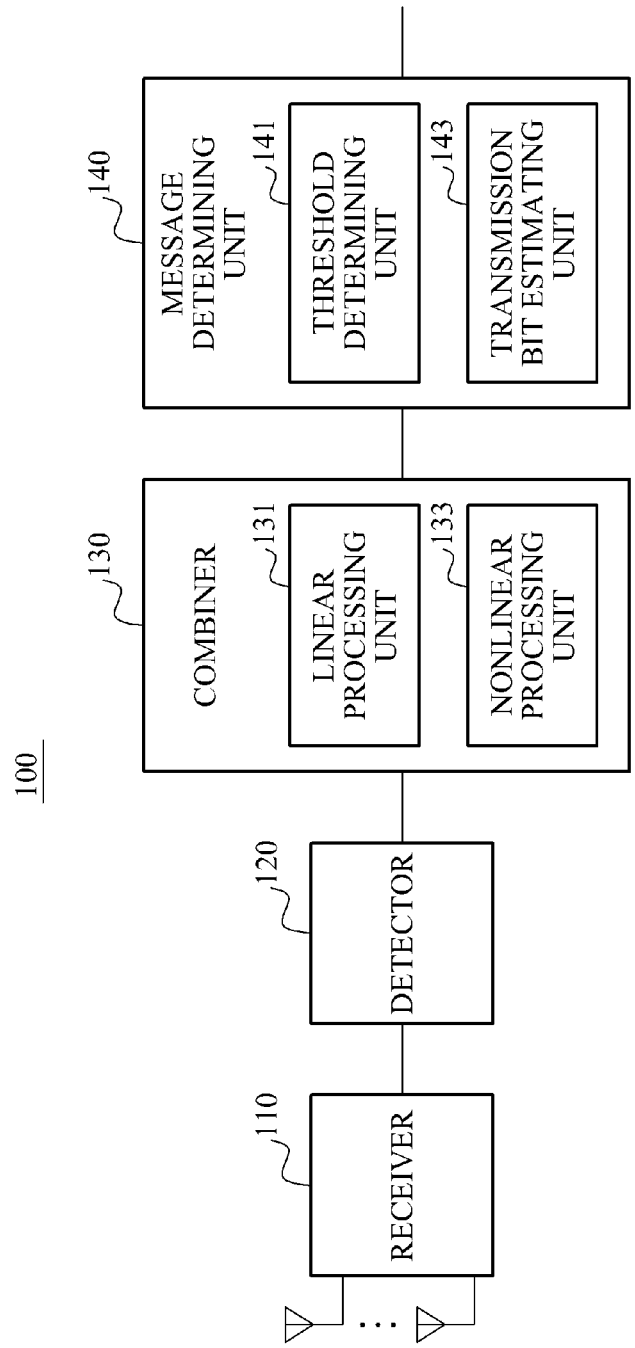
FIG. 1 is a diagram illustrating an example of an apparatus for receiving a signal using multiple antennas.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Various sensor devices installed in a wireless sensor network and a local area network may be of small size, low power, and low complexity. To operate a sensor device using low power and low complexity, a non-coherent modulation technology may be used. For example, a non-coherent on-off keying (OOK) and a non-coherent frequency shift keying (FSK) may determine whether a received signal exists using an envelope detector.

Even though a non-coherent modulation and demodulation technology may deteriorate in performance in comparison to a coherent modulation and demodulation technology, the non-coherent modulation and demodulation technology may not use a high cost synchronization process to accurately calculate a carrier phase value. In this example, by not using components that consume a relatively high amount of power such as a linear amplifier or a mixer used in an in-phase/quadrature-phase (I/Q) configuration, power may be saved and complexity may be reduced.

A modem technology such as a superheterodyne scheme may use a relatively high amount of power in a radio frequency (RF) part in comparison to a digital baseband part. For example, in a modem chip for a low power Wireless Personal Area Networks (WPAN) (IEEE 802.15.4), an analog component may consume a relatively high amount of power of about 21 mW in a reception mode and about 30 mW in a transmission mode that corresponds to 40 to 60 times 0.5 mW in a reception and transmission mode of a digital component.

Recently, studies have been performed on an overall communication modem using various low power RF configurations. For example, a super-regenerative receiver configuration may amplify an output signal and detect the output signal using a scheme of positively feeding back a received signal. The super-regenerative receiver configuration is commanding attention as an ultra low power receiver due to a relatively simple RF configuration that uses a relatively small number of active devices.

An RF receiver for transmitting and receiving an ultra low power may use a low power modulation technology such as an OOK.

A local area transmission and reception system using a low power and low complexity RF configuration and a modulation scheme may configure a low power structure, however, performance may deteriorate in an overall system due to a deterioration in an analog part.

Accordingly, a scheme may be used to expand a communication length between a transmitter and a receiver and/or to enhance a data transmission rate.

As an example, an ultra low power system such as a Wireless Body Area Network (WBAN) may have a communication length of about 3 meters. A medical device may communicate in an increased transmission and reception area for an emergency. In this example, important medical data and urgent data or data associated with an image may be transmitted and received at a relatively high transmission rate. A reception diversity technology may be used to expand a communication length and enhance a transmission rate in a low power communication system.

The reception diversity technology may acquire an SNR gain and a diversity gain by combining different wireless channels and by providing at least one antenna at a reception end to receive data.

In contrast to an existing reception diversity technology, a reception diversity technology according to various examples herein may be a technology suitable for a non-coherent OOK corresponding to a low power modulation scheme in a relatively simple configuration, and may be applied to a low power local area communication system.

FIG. 1 illustrates an example of an apparatus for receiving a signal using multiple antennas. For example, the apparatus may be a terminal such as a mobile terminal, a computer, a smart phone, a home appliance, a tablet, a sensor, and the like.

Referring to FIG. 1, an apparatus for receiving a signal using multiple antennas 100 includes a receiver 110, a detector 120, a combiner 130, and a message determining unit 140.

The receiver 110 may receive on-off keying modulated signals through a plurality of antennas such as K receiving antennas.

A transmitted signal at a transmission end may be an on-off keying signal that is modulated before being transmitted. An on-off keying modulated signal $S_i(t)$ may be expressed by the following Equation 1.

$$s_i(t) = \begin{cases} A\sqrt{\frac{2}{T}} \cos(2\pi ft), & 0 \leq t \leq T \text{ for } i = 1 \\ 0, & 0 \leq t \leq T \text{ for } i = 2 \end{cases} \quad \text{[Equation 1]}$$

In Equation 1, T denotes a single data symbol period, "f" denotes a carrier frequency, "for i=1" denotes a case in which a message bit corresponds to "1," and "for i=2" denotes a case in which the message bit corresponds to "0." Also in Equation 1, "A" corresponds to a constant number. In this example, a normalization may be performed to enable a transmission energy of $S_i(t)$ to be greater than or equal to $A^2$.

The transmission energy may correspond to "0" when the message bit corresponds to "0" and thus, an average energy per bit may correspond to "$A^2/2$" when a message bit "0" and a message bit "1" occur at the same probability.

The receiver 110 may receive a signal that passes a wireless channel and that is on-off keying modulated and combined with Additive White Gaussian Noise (AWGN). The receiver 110 may receive on-off keying modulated signals through K receiving antennas. In this example, K corresponds to a natural number. A signal received through a $K^{th}$ receiving antenna may be expressed by the following Equation 2.

$$r_k(t) = h_k A \sqrt{\frac{2}{T}} m(t)\cos(2\pi ft + \theta) + w_k(t) \quad \text{[Equation 2]}$$

In Equation 2, $h_k$ denotes a coefficient between a transmitting antenna and the $K^{th}$ receiving antenna, and may generally correspond to a complex number. If an AWGN channel environment is assumed, $h_k$ may correspond to a real number "1," and m(t) may have a value "0" or "1" based on a transmission bit. In Equation 2, θ denotes an unknown phase that is shifted to a constant value in an unstable channel. A signal may be detected without measuring a value of θ in a low power and low complex non-coherent receiver.

In Equation 2, $w_k(t)$ denotes an AWGN at the $K^{th}$ receiving antenna in which a power spectral density corresponds to $\sigma^2$.

The detector 120 may detect envelopes with respect to each of the signals that are received through the K receiving antennas. For example, the detector 120 may detect envelopes with respect to the received signals through various schemes. Thus, detector 120 may detect envelopes with respect to the received signals through a technology that is inferred and applied by a person skilled in a field associated with a technology for detecting an envelope.

The detector 120 may detect the envelopes based on a value that is generated by multiplying each of the signals received through the K receiving antennas by two orthogonal functions. The detector 120 may detect K envelopes with respect to K received signals. A $K^{th}$ envelope $r_{env,k}$ may be expressed by the following Equation 3.

$$r_{env,k} = \sqrt{y_{I,k}^2 + y_{Q,k}^2} = \sqrt{(\int_0^T r_k(t)\phi_1(t)dt)^2 + (\int_0^T r_k(t)\phi_2(t)dt)^2} \quad \text{[Equation 3]}$$

In Equation 3, $$\phi_1(t) = \sqrt{\frac{2}{T}} \cos(2\pi ft), \phi_2(t) = \sqrt{\frac{2}{T}} \sin(2\pi ft).$$

The detector 120 may square each of the correlators that are obtained through two orthogonal basis functions with respect to a signal received through the $K^{th}$ receiving antenna. The detector 120 may add the squared correlators, and apply a square root to the sum of the squared correlators, thereby detecting the envelopes. The detector 120 may square each of correlators that are obtained through two orthogonal basis functions with respect to a signal received through the $K^{th}$ receiving antenna. The detector 120 may add the squared correlators, thereby detecting the envelopes. By omitting an operation of applying a square root, a complexity in detecting the envelops may be reduced.

If noise is assumed to be absent from Equation 3, and the transmission bit corresponds to "1," $r_{env,k}$ may correspond to $\sqrt{(A|h_k|\cos(\theta+\angle h_k))^2 + (A|h_k|\sin(\theta+\angle h_k))^2} = A|h_k|$. In this example, the detector 120 may detect an envelope of a received signal when a phase value θ to of a carrier wave and $\angle h_k$ corresponding to a phase of a wireless channel coefficient $h_k$ are unknown. If the transmission bit corresponds to "0" and noise is neglected, $r_{env,k}$ may correspond to "0."

When the transmission bit corresponds to "1," $r_{env,k}$ may probabilistically have a Rician probability distribution in which a square root is applied to a sum of two squared Gaussian probability variables. In this example, a mean of the two squared Gaussian probability variables may not correspond to "0." If the transmission bit corresponds to "0," $r_{env,k}$ may have the Rayleigh probability distribution in which a square root is applied to a sum of two squared Gaussian probability variables. In this example, a mean of the two squared Gaussian probability variables may correspond to "0."

When the transmission bit corresponds to "1," two probability variables $y_{I,k}$ and $y_{Q,k}$ in $r_{env,k} = \sqrt{y_{I,k}^2 + y_{Q,k}^2}$ may correspond to Gaussian probability variables in which a sum of squares of means corresponds to $(A|h_k|)^2$, and each variance corresponds to $\sigma^2$. When the transmission bit corresponds to "0," the two probability variables $y_{I,k}$ and $y_{Q,k}$ may correspond to Gaussian probability variables in which the mean corresponds to "0," and variance corresponds to $\sigma^2$.

The combiner 130 may combine signals that are generated by performing a linear processing and a nonlinear processing with respect to each of the K detected envelopes. The combiner 130 may square each of the K detected envelopes and apply a square root to a sum of the squared K detected envelopes, thereby generating a combined signal. A signal $r_{env,div}$ combined by the combiner 130 may be expressed by the following Equation 4.

$$r_{env,div} = \sqrt{\sum_{k=1}^{K} r_{env,k}^2} = \sqrt{\sum_{k=1}^{K} (y_{I,k}^2 + y_{Q,k}^2)} \qquad [\text{Equation 4}]$$

Overall, $r_{env,div}$ may have a general probability distribution configured by 2K Gaussian probability variables. In this example, $r_{env,div}$ may have a Rician probability distribution configured by 2K Gaussian probability variables when the transmission bit corresponds to "1," and $r_{env,div}$ may have a Rayleigh probability distribution configured by 2K Gaussian probability variables when the transmission bit corresponds to "0."

In the example of FIG. 1, the combiner 130 includes a linear processing unit 131 and a nonlinear processing unit 133.

The linear processing unit 131 may square each of the K detected envelopes, and may multiply each of the K detected envelopes by a predetermined weight. For example, the predetermined weight may correspond to a linear parameter that is based on a size of the detected envelopes when the transmission bit corresponds to "1," and based on a mean value of squares of the detected envelopes when the transmission bit corresponds to "0."

The linear processing unit 131 may add the results obtained by squaring each of the K detected envelopes. The nonlinear processing unit 133 may perform a logarithmic process with respect to each of the K detected envelopes. Examples of the linear processing unit 131 and the nonlinear processing unit 133 are described with reference to FIG. 4 through FIG. 6.

A scheme of estimating a bit value that is transmitted from a transmission end, using a value received at a reception end may be a scheme of minimizing a BER between a transmitter and a receiver. For example, it may be assumed that a transmission bit "0" and a transmission bit "1" are transmitted at the same probability, and a signal $r_{env,div}$ combined to by the combiner 130 is measured to be a predetermined value.

In this example, to minimize the BER, a probability of the combined signal $r_{env,div}$ that is received when a transmission bit "0" is transmitted may be compared with a probability of the combined signal $r_{env,div}$ that is received when a transmission bit "1" is transmitted. The transmission bit corresponding to a higher probability may be estimated as the bit value transmitted from a transmission end. An example of the described estimation scheme may be referred to as a Maximum-Likelihood Detecting scheme.

A relatively efficient Maximum-Likelihood Detecting scheme may be determined based on a setting of an estimated region corresponding to each transmission bit. The relatively efficient Maximum-Likelihood Detecting scheme may be determined based on a setting of a threshold used for estimating a transmission bit. In this example, the setting of a threshold may influence a performance of a non-coherent OOK system.

A message determining scheme in a non-coherent OOK may be different from a scheme that uses a general observation vector that has an existing Gaussian probability distribution. Each component of an observation vector measured by a general modulating scheme may have the same Gaussian distribution. Thus, the distances between a mean value and each message point may be compared with each other, and a message corresponding to a point that has the shortest distance may be determined as a transmission message. For example, if a number of message points corresponds to two, an intermediate value of each message point may correspond to a threshold.

However, the non-coherent OOK may have a Rician probability distribution or a Rayleigh probability distribution, which may be different from each other, based on a value of a transmission bit. In this example, a point at which the Rician probability distribution intersects the Rayleigh probability distribution may correspond to a threshold. However, an accurate threshold may be difficult to calculate because functions of the Rician probability to distribution or the Rayleigh probability distribution have complex forms. Thus, a scheme may be used to determine a threshold that is relatively close to an optimal threshold.

The message determining unit 140 may determine a message value of the on-off keying modulated signals by comparing the combined signal $r_{env,div}$ that is combined by the combiner 130, with a threshold that is determined based on the K receiving antennas, a system parameter, and a status of a channel through which the on-off keying modulated signals are transmitted.

In the example of FIG. 1, the message determining unit 140 includes a threshold determining unit 141 and a transmission bit estimating unit 143.

For example, the threshold determining unit 141 may determine an optimal threshold based on the Rayleigh probability density function of the combined signal $r_{env,div}$ when a transmission bit corresponds to "0" and the Rician probability density function of the combined signal $r_{env,div}$ when the transmission bit corresponds to "1."

If the combined signal $r_{env,div}$ is denoted by a probability variable X and the transmission bit corresponds to "0," the Rayleigh probability density function of the probability variable X may be expressed by the following Equation 5.

$$f_X(x) = \frac{x^{2K-1}}{2^{K-1} \sigma^{2K} (K-1)!} \exp\left(-\frac{x^2}{2\sigma^2}\right) \qquad [\text{Equation 5}]$$

If the transmission bit corresponds to "1" the Rician probability density function of the probability variable X may be expressed by the following Equation 6.

$$f_X(x) = \frac{x^K}{\sigma^2 s^{K-1}} \exp\left(-\frac{x^2+s^2}{2\sigma^2}\right) I_{K-1}\left(\frac{xs}{\sigma^2}\right) \quad \text{[Equation 6]}$$

In Equation 6, $I_n(x)$ corresponds to an $n^{th}$ order modified Bessel function of the first kind, and $s^2 = A^2 \sum_{k=1}^{K} |h_k|^2$.

In this example, the Rician probability distribution and the Rayleigh probability distribution both have a general value for K. To obtain a value to cause the Rician probability distribution and the Rayleigh probability distribution to be equal, the following Equation may be evaluated.

$$\frac{x^{2K-1}}{2^{K-1}\sigma^{2K}(K-1)!}\exp\left(-\frac{x^2}{2\sigma^2}\right) = \frac{x^K}{\sigma^2 s^{K-1}}\exp\left(-\frac{x^2+s^2}{2\sigma^2}\right)I_{K-1}\left(\frac{xs}{\sigma^2}\right)$$

A value of X that satisfies the Equation above may correspond to the optimal threshold, and the Equation above may be expressed by the following Equation 7.

$$\frac{x^{K-1}s^{K-1}}{2^{K-1}\sigma^{2(K-1)}(K-1)!}\exp\left(\frac{s^2}{2\sigma^2}\right) = I_{K-1}\left(\frac{xs}{\sigma^2}\right) \quad \text{[Equation 7]}$$

Because $I_n(x)$ is complex, the value of Equation 7 may not be accurately obtained in a closed-form, and may be obtained using various numerical schemes. As a classical scheme, a scheme of assuming a relatively high SNR region and setting s/2 as a threshold may be used.

A scheme in which a threshold is set to A/2, that is, s=A in an existing singular receiving antenna system and K=1, may correspond to the scheme of assuming a relatively high SNR region and setting s/2 as a threshold. In the scheme of setting A/2 as a threshold, if the transmission bit corresponds to "1" and the AWGN is neglected in the combined signal $r_{env,div}$, "s" may correspond to $A\sqrt{\sum_{k=1}^{K}|h_k|^2}$, and the threshold may correspond to a value that is obtained by multiplying by $A\sqrt{\sum_{k=1}^{K}|h_k|^2}$ by ½. The scheme of setting A/2 as a threshold may assume that the threshold corresponds to a roughly intermediate value of a value of "s," and may be a relatively simple scheme of determining a threshold. The scheme for setting A/2 as a threshold, however, may not consider an asymmetric form of a probability distribution when the transmission bit corresponds to "1" or "0," and may cause deterioration in performance.

The threshold determining unit 141 may determine a threshold by adding a value based on an SNR to s/2. The determining may correspond to evaluating Equation 7 when $x=(1+\alpha)*s/2$. In this example, "x" may be expressed by an enhanced threshold. A high SNR region may be assumed, and the following approximation may be used with respect to $I_n(x)$.

$$I_n(x) \cong \frac{\exp(x)}{\sqrt{2\pi x}} \text{ for } x \to \infty$$

The equation above for $I_n(x)$ may be held with respect to all integers n. When the approximated $I_n(x)$ and "x" are substituted into Equation 7, the following equation is obtained.

$$\frac{\left[(1+\alpha)\frac{s^2}{2}\right]^{K-1}}{2^{K-1}\sigma^{2(K-1)}(K-1)!}\exp\left(\frac{s^2}{2\sigma^2}\right) \cong \frac{\exp\left((1+\alpha)\frac{s^2}{2\sigma^2}\right)}{\sqrt{2\pi(1+\alpha)\frac{s^2}{2\sigma^2}}}$$

When a value of $$\frac{s^2}{2\sigma^2}$$

is assumed to be an extremely large value, a value of $\alpha$ is calculated as follows.

$$\alpha \cong \frac{2\sigma^2}{s^2}\ln\left(\frac{\sqrt{2\pi}}{2^{K-1}(K-1)!}\left(\frac{s^2}{2\sigma^2}\right)^{K-\frac{1}{2}}\right)$$

Thus, the enhanced threshold x to be obtained, and denoted by $\zeta$, $\zeta$ may be expressed by the following Equation 8.

$$\zeta = \left\{1 + \frac{2\sigma^2}{s^2}\ln\left(\frac{\sqrt{2\pi}}{2^{K-1}(K-1)!}\left(\frac{s^2}{2\sigma^2}\right)^{K-\frac{1}{2}}\right)\right\} \cdot \frac{s}{2} \quad \text{[Equation 8]}$$

Equation 8 may be applied to an example of general K receiving antennas and a to general $\sigma^2$. The threshold determining unit 141 may determine a threshold based on a plurality of receiving antennas and the power of a noise component in a high SNR region.

Even though K corresponds to "1," that is, the number of receiving antennas corresponds to one, an enhanced threshold $\zeta$ may be based on "s," corresponding to a magnitude of a received signal, and $\sigma^2$, corresponding to a power of a noise component, and thus, the threshold determining unit 141 may determine a more accurate threshold.

The enhanced threshold $\zeta$ of Equation 8 may be obtained on the assumption of a high SNR region. Accordingly, the enhanced threshold $\zeta$ may be greatly different from the optimal threshold in a low SNR region. An increased error in a threshold may cause deterioration in performance.

The threshold determining unit 141 may determine the optimal threshold based on the low SNR region. An approximation may be used with respect to $I_n(x)$ in the low SNR region using $$I_n(x) = \sum_{m=0}^{\infty} \frac{((1/2)x)^{n+2m}}{m!(n+m)!}.$$

$$I_n \cong \frac{1}{n!}\left(\frac{1}{2}x\right)^n + \frac{1}{(n+1)!}\left(\frac{1}{2}x\right)^{n+2} + \frac{1}{2!(n+2)!}\left(\frac{1}{2}x\right)^{n+4}$$

for $x \ll 1$

When approximated $I_n(x)$ and "x" may be substituted into Equation 7, and the following equation is obtained.

$$\frac{x^{K-1}s^{K-1}}{2^{K-1}\sigma^{2(K-1)}(K-1)!}\exp\left(\frac{s^2}{2\sigma^2}\right) \cong$$

$$\frac{1}{(K-1)!}\left(\frac{1}{2}\cdot\frac{xs}{\sigma^2}\right)^{K-1} + \frac{1}{K!}\left(\frac{1}{2}\cdot\frac{xs}{\sigma^2}\right)^{K+1} + \frac{1}{2!(K+1)!}\left(\frac{1}{2}\cdot\frac{xs}{\sigma^2}\right)^{K+3}$$

When "x" satisfying the above equation is evaluated, the following Equation 9 is obtained.

$$x \cong \frac{2\sigma^2}{s}\sqrt{\sqrt{(K+1)\left(1+K\left(2\exp\left(\frac{s^2}{2\sigma^2}\right)-1\right)\right)}-(K+1)} \quad \text{[Equation 9]}$$

The threshold determining unit 141 may determine a reference SNR for determining a threshold of a high SNR region or a threshold of a low SNR region.

The threshold determining unit 141 may determine the reference SNR using a parameter such as a ratio of a value of a third term to a value of a fourth term in a polynomial of $I_n(x)$ for calculating a threshold in the low SNR region.

A value obtained by dividing the third term by the fourth term in $I_n(x)$ may be expressed by the following Equation 10.

$$\frac{\frac{1}{2!(K+1)!}\left(\frac{1}{2}\cdot\frac{xs}{\sigma^2}\right)^{K+3}}{\frac{1}{3!(K+2)!}\left(\frac{1}{2}\cdot\frac{xs}{\sigma^2}\right)^{K+5}} = 3(K+2)\left(\frac{1}{2}\cdot\frac{xs}{\sigma^2}\right)^{-2} \quad \text{[Equation 10]}$$

The threshold determining unit 141 may use a threshold of the low SNR region when $$3(K+2)\left(\frac{1}{2}\cdot\frac{xs}{\sigma^2}\right)^{-2}$$

is larger than β corresponding to a system parameter, and may use a threshold of the high SNR region when $$3(K+2)\left(\frac{1}{2}\cdot\frac{xs}{\sigma^2}\right)^{-2}$$

is less than or equal to β.

When the reference SNR, greater than β, is calculated by substituting the threshold of the low SNR region into "x" of Equation 10, the following inequality is obtained.

$$\frac{s^2}{2\sigma^2} < \ln\left(\frac{1}{2K}\left[1-K+\left(K+1+\frac{3(K+2)}{\beta}\right)^2 \bigg/ (K+1)\right]\right)$$

The threshold determining unit 141 may use the threshold of the low SNR region when $$\frac{s^2}{2\sigma^2},$$

corresponding to an SNR value of the combined signal $r_{env,div}$, satisfies the inequality above. Otherwise, the threshold determining unit 141 may use the threshold of the high SNR region.

In contrast to the enhanced threshold ζ considering only the high SNR region, a refined enhanced threshold may consider the low SNR region as well as the high SNR region, and may be denoted by $\zeta_{ref}$. In this example, $\zeta_{ref}$ may be expressed by the following Equation 11.

$$\zeta_{ref} = \begin{cases} \frac{2\sigma^2}{s}\sqrt{\sqrt{(K+1)\left(1+K\left(2\exp\left(\frac{s^2}{2\sigma^2}\right)-1\right)\right)}-(K+1)}, & \text{for } \frac{s^2}{2\sigma^2} < \rho \\ \left\{1+\frac{2\sigma^2}{s^2}\ln\left(\frac{\sqrt{2\pi}}{2^{K-1}(K-1)!}\left(\frac{s^2}{2\sigma^2}\right)^{K-\frac{1}{2}}\right)\right\}\cdot\frac{s}{2}, & \text{otherwise} \end{cases} \quad \text{[Equation 11]}$$

In Equation 11, a value of ρ corresponds to the reference SNR region, and may be expressed as follows.

$$\rho = \ln\left(\frac{1}{2K}\left[1-K+\left(K+1+\frac{3(K+2)}{\beta}\right)^2 \bigg/ (K+1)\right]\right)$$

In Equation 11, "s" denotes a value in which AWGN is neglected in the combined signal $r_{env,div}$ of the combiner 130 when the transmission bit corresponds to "1," $\sigma^2$ denotes a power spectral density of the AWGN, and K denotes the number of receiving antennas.

For example, the threshold determining unit 141 may determine the threshold of the high SNR region as the optimal threshold when an SNR of the combined signal $r_{env,div}$ is greater than or equal to the reference SNR.

As another example, the threshold determining unit 141 may determine the threshold of the low SNR region as the optimal threshold when the SNR of the combined signal $r_{env,div}$ is less than the reference SNR.

The transmission bit estimating unit 143 may estimate a transmission bit by comparing the combined signal $r_{env,div}$ to the optimal threshold.

The transmission bit estimating unit 143 may estimate the transmission bit to be "0" when the combined signal $r_{env,div}$ is less than the optimal threshold, and may estimate the transmission bit to be "1" when the combined signal $r_{env,div}$ is greater than the optimal threshold. For example, if the optimal threshold corresponds to the refined enhanced threshold $\zeta_{ref}$, the transmission bit may be estimated as follows.

$$\hat{m} = \begin{cases} 0, & \text{if } r_{env,div} < \zeta_{ref} \\ 1, & \text{if } r_{env,div} > \zeta_{ref} \end{cases}$$

Figure 2:
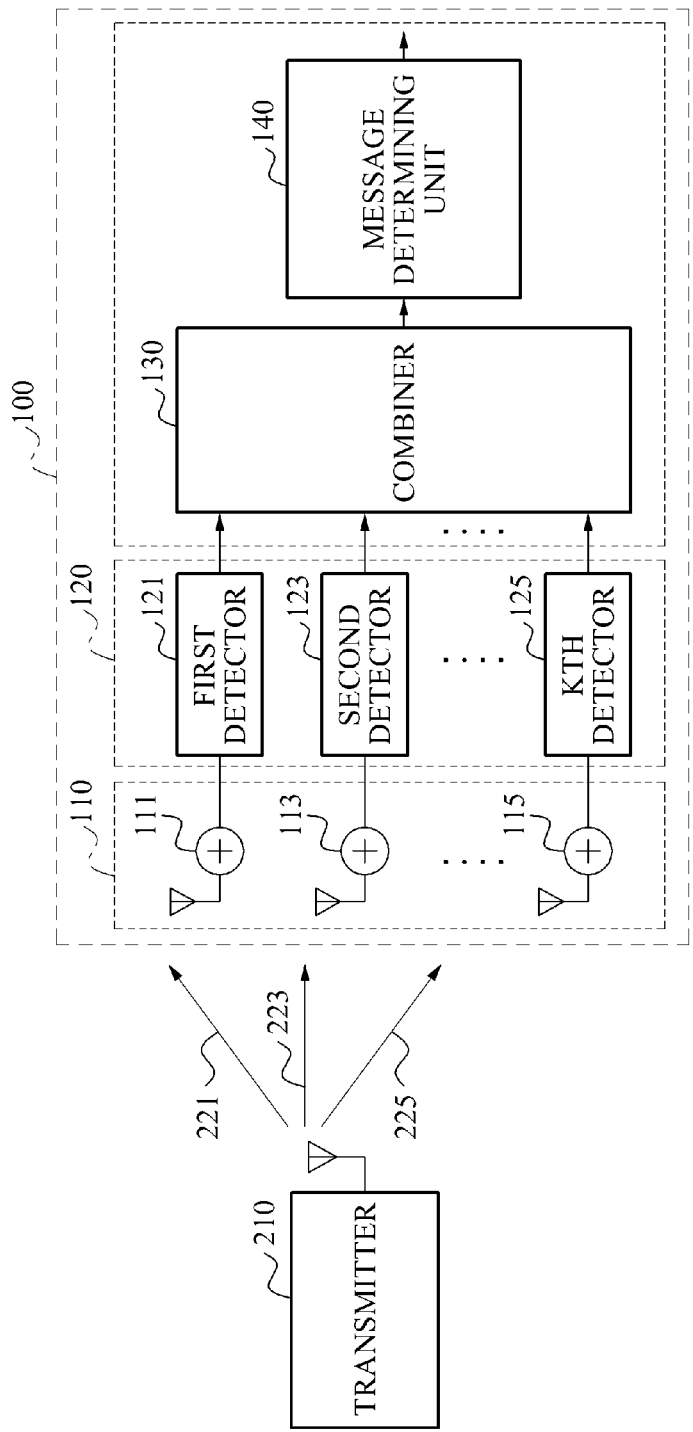
FIG. 2 is a diagram illustrating an example of a reception diversity system.

FIG. 2 illustrates an example of a reception diversity system. The reception diversity system may be used for transmitting and receiving a low-power on-off keying modulation and demodulation signal.

Referring to FIG. 2, the reception diversity system includes a transmitter 210, a to receiver 110, a detector 120, a combiner 130, and a message determining unit 140.

An OOK modulated transmitted signal that is transmitted from the transmitter 210 may pass through wireless channels 221, 223, and 225, and may be received by an apparatus for receiving a signal using multiple antennas 100. A wireless channel environment may be classified into an AWGN environment or a Rayleigh fading environment. In the AWGN environment, $h_k$, corresponding to a coefficient between a transmitting antenna and a $K^{th}$ receiving antenna, may be at a constant of 1. In the Rayleigh fading environment, $h_k$ may have a value of a complex Gaussian random variable.

When AWGN 111, 113, and 115 are added to a signal that is received through the receiver 110, a received signal at each receiving antenna may be input to the detector 120. The detector 120 may include a first detector 121, a second detector 123, ..., and a $K^{th}$ detector 125 that correspond to the K receiving antennas. Output values that are output from the detector 120, for example, envelopes detected from each receiving signal may be combined through the combiner 130.

A message determining process may be performed to determine a message bit value that is transmitted from the transmitter 210 using an output value that is output from the combiner 130 (i.e. the combined signal). For example, the message determining process may use a threshold that is calculated appropriately to a channel status. A threshold may be determined differently based on a process of combining, by performing a linear process or a nonlinear process with respect to envelopes that are detected and combined by the combiner 130.

Figure 3A:
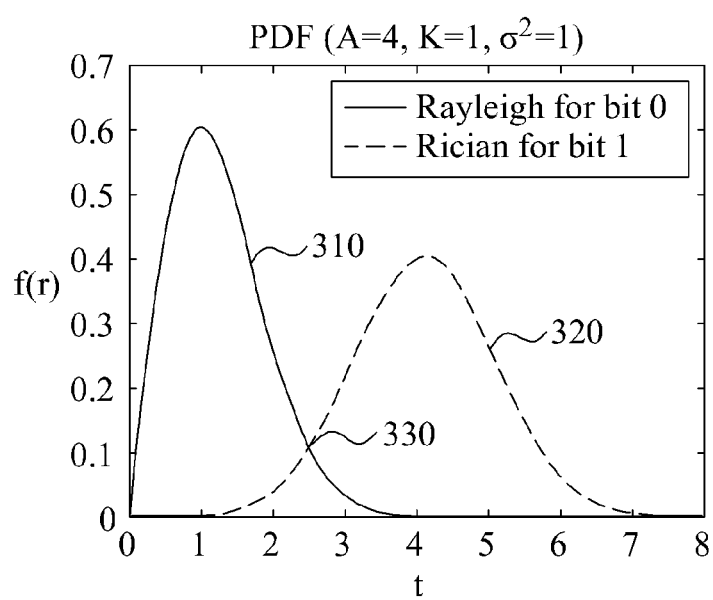
FIGS. 3A and 3B are graphs illustrating examples of coherent and non-coherent modulation.
Figure 3B:
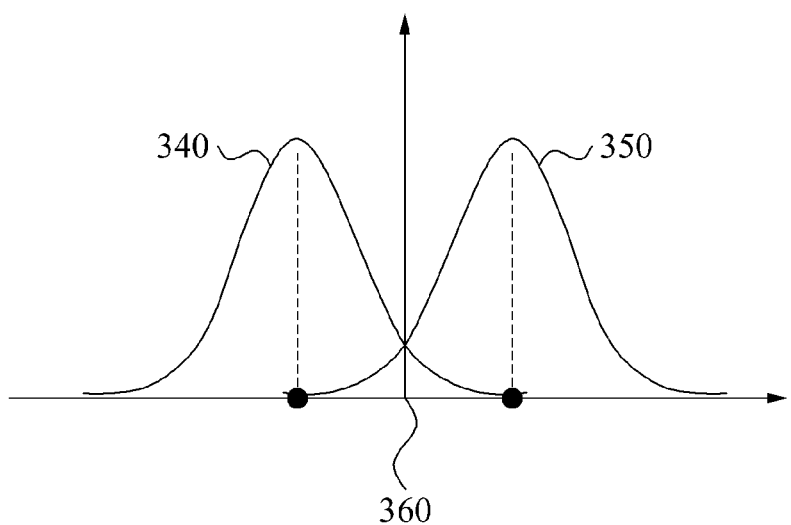

FIGS. 3A and 3B illustrate examples of graphs of coherent and non-coherent modulation.

FIG. 3A illustrates a probability distribution of an envelope detected from a non-coherent OOK modulated received signal when the transmission bit corresponds to "1" or "0." FIG. 3B illustrates a probability distribution of an envelope detected from a coherent Binary Phase Shift Keying (BPSK) modulated received signal when the transmission bit corresponds to "1" or "0."

The envelope of FIG. 3A has a Rayleigh distribution 310 when the transmission bit corresponds to "0" and has a Rician distribution 320 when the transmission bit corresponds to "1." Accordingly, a probability distribution may be asymmetric when the transmission bit corresponds to "0" or "1." A threshold for estimating a transmission bit may be determined at a point 330 at which the Rayleigh distribution intersects the Rician distribution. However, the probability distribution may be asymmetric, and the point at which the Rayleigh distribution intersects the Rician distribution may be difficult to calculate. Thus, even though an accurate threshold may not be calculated, an optimal threshold may be determined using various numerical schemes described herein.

The envelope of FIG. 3B has a Gaussian distribution 340 and 350 when the transmission bit corresponds to "0" or "1." A probability distribution may be symmetric when the transmission bit corresponds to "0" or "1." Thus, a point 360, at which the Gaussian distribution 340 having "0" as the transmission bit intersects the Gaussian distribution 350 having "1" as the transmission bit may be easy to calculate. For example, the point 360 may be calculated by calculating an intermediate value between mean values of each Gaussian distribution.

Figure 4:
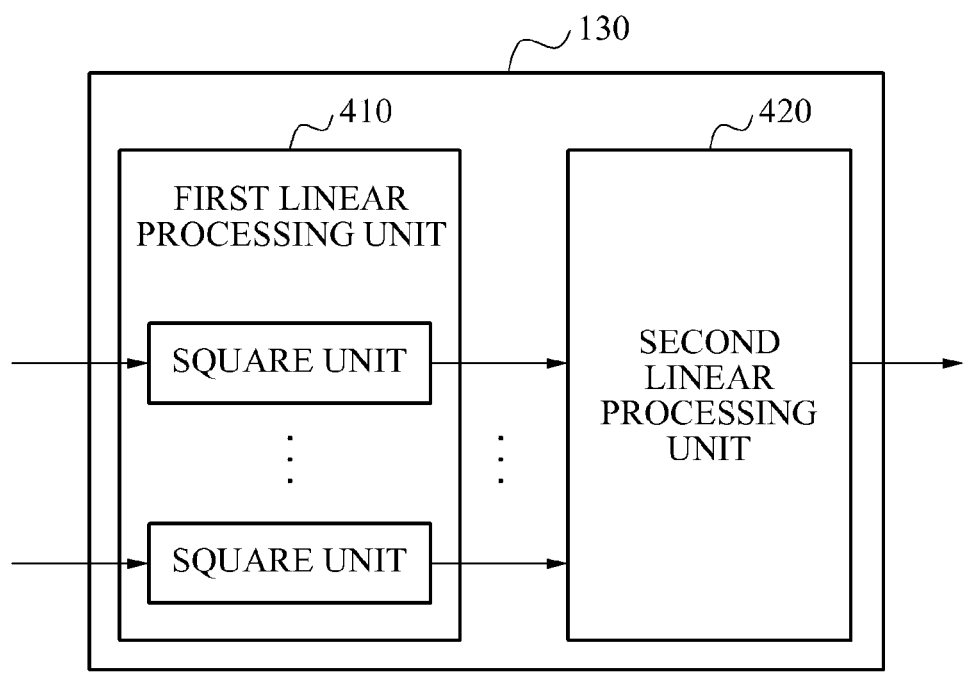
FIG. 4 is a diagram illustrating an example of a combiner.

FIG. 4 illustrates an example of a combiner.

Referring to FIG. 4, combiner 130 includes a first linear processing unit 410 and a second linear processing unit 420.

The first linear processing unit 410 may square each of the K detected envelopes. The first linear processing unit 410 may include K square units corresponding to the K detected envelopes. A square unit corresponding to each envelope may square and output the envelope.

For example, the second linear processing unit 420 may combine the K squared signals, and may perform a square root process with respect to the combined result. As another example, the second linear processing unit 420 may combine the K squared signals and may not perform the square root process with respect to the combined result. For example, the second linear processing unit 420 may combine the K squared signals through an adder.

In this example, an enhanced threshold $\zeta$ may be determined to be $$\zeta = \left\{ 1 + \frac{2\sigma^2}{s^2} \ln\left( \frac{\sqrt{2\pi}}{2^{K-1}(K-1)!} \left(\frac{s^2}{2\sigma^2}\right)^{K-\frac{1}{2}} \right) \right\} \cdot \frac{s}{2},$$

and a refined enhanced threshold $\zeta_{ref}$ may be determined to be $$\zeta_{ref} = \begin{cases} \frac{2\sigma^2}{s} \sqrt{\sqrt{(K+1)\left(1 + K\left(2\exp\left(\frac{s^2}{2\sigma^2}\right) - 1\right)\right)} - (K+1)}, & \text{for } \frac{s^2}{2\sigma^2} < \rho \\ \left\{ 1 + \frac{2\sigma^2}{s^2} \ln\left( \frac{\sqrt{2\pi}}{2^{K-1}(K-1)!} \left(\frac{s^2}{2\sigma^2}\right)^{K-\frac{1}{2}} \right) \right\} \cdot \frac{s}{2}, & \text{otherwise.} \end{cases}$$

Figure 5:
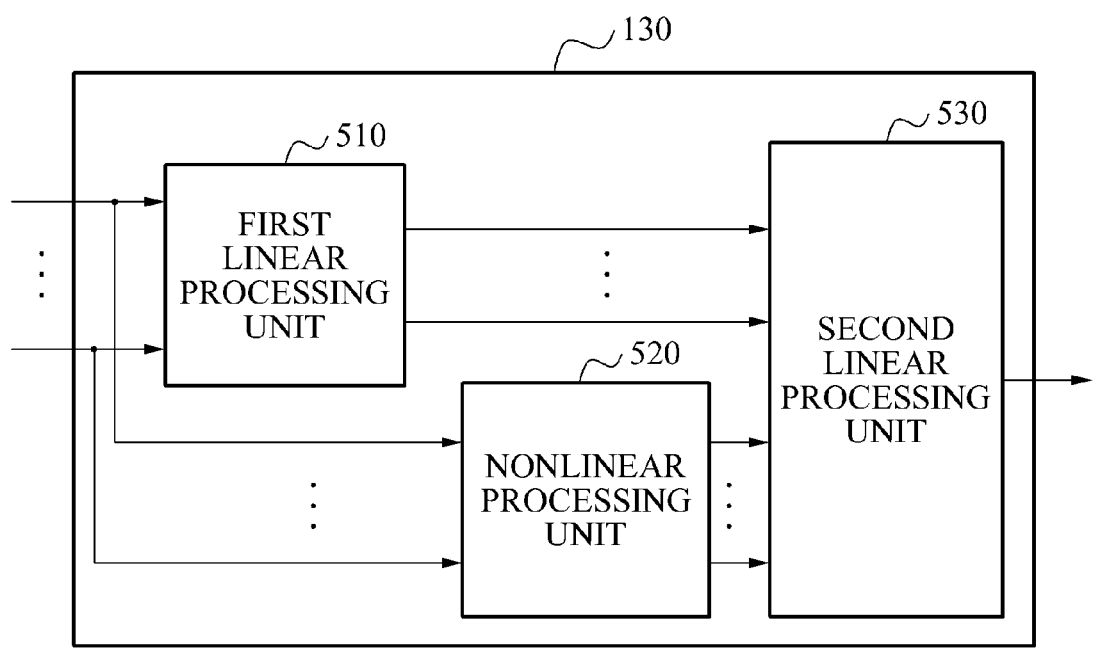
FIG. 5 is diagram illustrating another example of a combiner.

FIG. 5 illustrates another example of a combiner.

Referring to FIG. 5, to more accurately estimate a transmission bit, combiner 130 includes a first linear processing unit 510, a nonlinear processing unit 520, and a second linear processing unit 530.

The first linear processing unit 510 may multiply each of the K detected envelopes by a linear parameter that is based on a size of the detected envelopes when a transmission bit corresponds to "1" and based on a mean value of squares of the detected envelopes when the transmission bit corresponds to "0."

For example, the first linear processing unit 510 may multiply a $K^{th}$ envelope by a linear parameter $$\frac{2s_k}{\sigma^2}.$$

In this example, $s_k$ denotes a magnitude of a signal component neglecting noise in an envelope $r_{env,k}$ having "1" as a transmission bit. In this example, $\sigma^2$ denotes a value that is obtained by dividing a mean of squares of envelopes having "0" as a transmission bit, by 2.

The nonlinear processing unit 520 may perform a logarithmic process with respect to each of the K detected envelopes. For example, the nonlinear processing unit 520 may perform a minus natural logarithmic process with respect to the $K^{th}$ envelope to be expressed by $-\ln(r_{env,k})$.

In this example, a natural logarithmic process may be implemented using a polynomial series as an approximation scheme. For example, a Taylor series may be used as an example of the polynomial series. Thus, the natural logarithmic process may be implemented using the following $n^{th}$ approximated logarithm function.

$$\ln(y) \cong 2\left(z + \frac{1}{3}z^3 + \frac{1}{5}z^5 + \ldots + \frac{1}{2n-1}z^{2n-1}\right)$$

$$\text{where } z = \frac{y-1}{y+1}$$

The second linear processing unit 530 may combine signals in which the linear parameter is multiplied and signals in which the logarithmic process is performed. For example, the second linear processing unit 530 may use an adder to combine the signals in which the linear parameter is multiplied and the signals in which the logarithmic process is performed.

For example, the threshold determining unit 141 may calculate a threshold using an) approximated $I_n(x)$ and a Log-Likelihood Ratio $\ln \Lambda(r_{env})$. In this example, $r_{env}$ denotes a set of the K detected envelopes, that is, $r_{env}=[r_{env,1}, r_{env,2}, \ldots, r_{env,K}]$.

The threshold calculated using the Log-Likelihood Ratio $\ln \Lambda(r_{env})$ may be calculated through the following Equation 12.

Log-Likelihood Ratio $\ln\Lambda(r_{env}) \cong$  [Equation 12]

$$\sum_{k=1}^{K}\left(\frac{1}{\sigma^2}r_{env,k}s_k - \frac{1}{2}\ln r_{env,k}\right) - \frac{1}{2}\sum_{k=1}^{K}\left(\ln\left(\frac{2\pi}{\sigma^2}s_k\right) + \frac{1}{\sigma^2}s_k^2\right)$$

In this example, the threshold may correspond to $$\zeta_{SML} = \sum_{k=1}^{K}\left(\ln\left(\frac{2\pi}{\sigma^2}s_k\right) + \frac{1}{\sigma^2}s_k^2\right).$$

Also, $$\sum_{k=1}^{K}\left(\frac{1}{\sigma^2}r_{env,k}s_k - \frac{1}{2}\ln r_{env,k}\right)$$

may correspond to a combined signal component $r_{env,div}$. Here, $s_k=A|h_k|$, and $s_k$ denotes a magnitude of a signal component neglecting noise in an envelope $r_{env,k}$ having "1" as a transmission bit.

Figure 6:
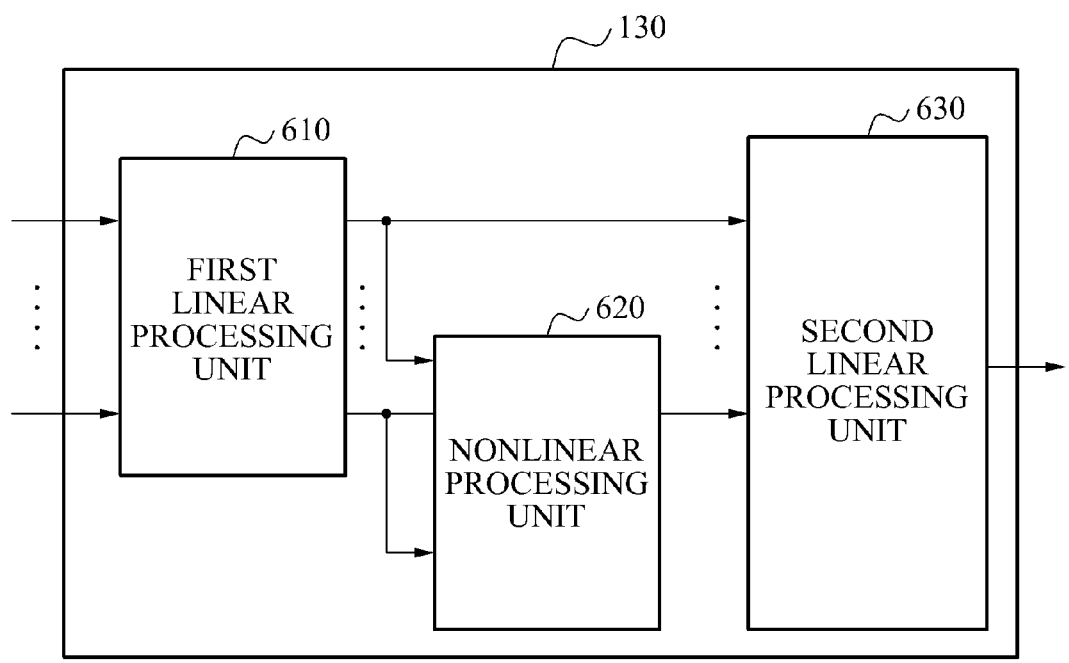
FIG. 6 is diagram illustrating another example of a combiner.

FIG. 6 illustrates another example of the combiner.

Referring to FIG. 6, combiner 130 includes a first linear processing unit 610, a nonlinear processing unit 620, and a second linear processing unit 630.

The first linear processing unit 610 may multiply each of the K detected envelopes by a linear parameter that is based on a size of the detected envelopes when a transmission bit corresponds to "1" and based on a mean value of squares of the detected envelopes when the transmission bit corresponds to "0."

For example, the first linear processing unit 610 may multiply a $K^{th}$ envelope by a linear parameter $$\frac{as_k}{\sigma^2}.$$

In this example, $s_k$ denotes a magnitude of a signal component neglecting noise in an envelope $r_{env,k}$ having "1" as a transmission bit. $\sigma^2$ denotes a value that is obtained by dividing a mean of squares of envelopes having "0" as a transmission bit, by 2. Also, "a" denotes a predetermined constant number.

The nonlinear processing unit 620 may perform a logarithmic process with respect to each of signals in which the linear parameter is multiplied. The nonlinear processing unit 620 may perform a minus natural logarithmic process with respect to a signal in which a $K^{th}$ linear parameter is multiplied, to be expressed by $$-\frac{a}{2}\ln\left(\frac{as_k}{\sigma^2}r_{env,k}\right).$$

The second linear processing unit 630 may combine signals in which the linear parameter is multiplied and signals in which the logarithmic process is performed. The second linear processing unit 630 may combine the signals in which the linear parameter is multiplied and the signals in which the logarithmic process is performed, through an adder.

In this example, the threshold determining unit 141 may calculate a threshold using an approximated $I_n(x)$ and a Log-Likelihood Ratio $\ln\Lambda(r_{env})$. The calculated threshold may correspond to $$\zeta_{SML} = \frac{a}{2}\left(K\ln\frac{2\pi}{a} + \sum_{k=1}^{K}\frac{s_k^2}{\sigma^2}\right).$$

FIG. 7 illustrates an example of a BER according to an SNR for each threshold that is determined when a number of receiving antennas corresponds to one and two.

Figure 7A:
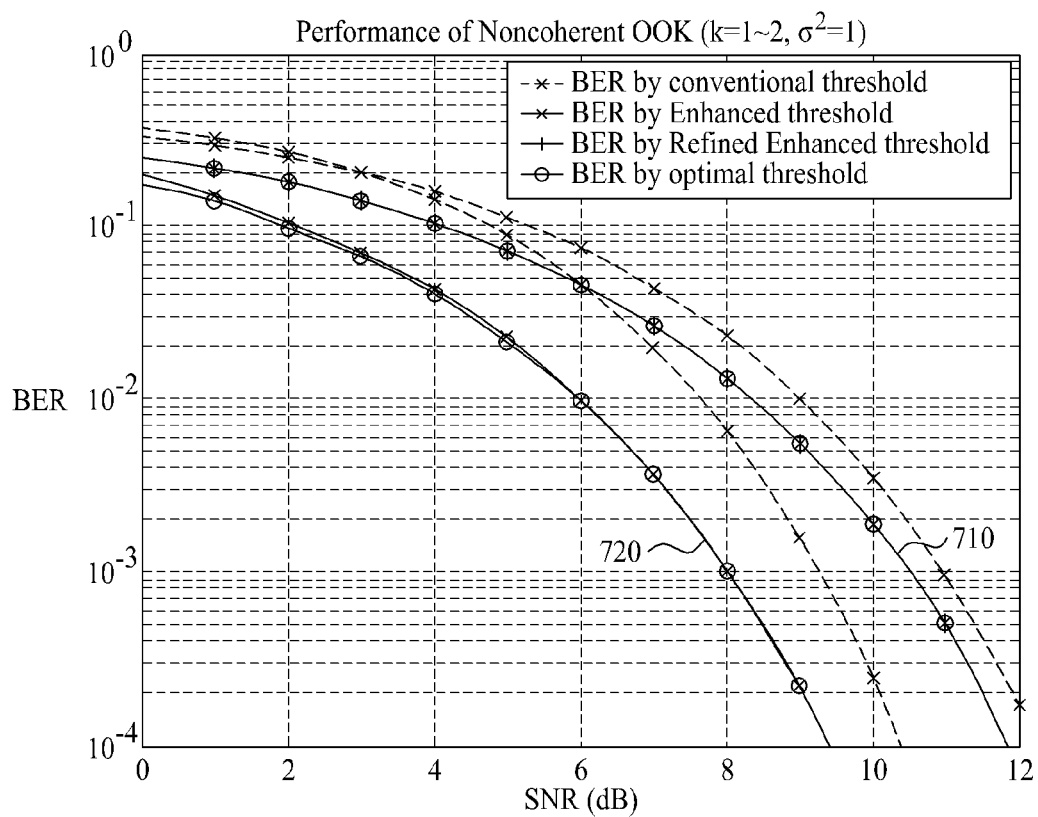
FIGS. 7A and 7B are graphs illustrating an example of a bit error rate (BER) according to a signal to noise ratio (SNR) for each threshold determined.

FIG. 7A illustrates a BER according to an SNR in an AWGN environment, that is, when a channel coefficient is set to $h_k=1$ (for all k). FIG. 7A corresponds to a result of a performance in which a number of receiving antennas K is set to K=1, 2, and an SNR value corresponds to Eb/No. In this example, "Eb" denotes an average energy per bit, and corresponds to $A^2/2$, and "No" denotes a value that is associated with a power spectral density of an AWGN signal, and is set to $2\sigma^2$.

A conventional threshold may be set to s/2, and an enhanced threshold and a refined enhanced threshold may correspond to the above-derived $\zeta$ and $\zeta_{ref}$, respectively.

An optimal threshold may be determined using a scheme of changing a predetermined threshold at step size=0.001, and finding a point at which a difference between the Rayleigh probability density function and the Rician probability density function is minimized.

FIG. 7A illustrates that performance may increase as a number of antennas increases. Referring to FIG. 7A, a scheme of determining the enhanced threshold and the refined enhanced threshold may have a similar performance as a scheme of determining an optimal threshold in an SNR region.

A system that is illustrated by a curved line 710 and that is based on two receiving antennas using a provided enhanced threshold and refined enhanced threshold may obtain an SNR gain of about 3 dB at $10^{-3}$ BER in comparison to a system that is illustrated by a curved line 720 and that is based on a single receiving antenna using a conventional threshold.

Figure 7B:
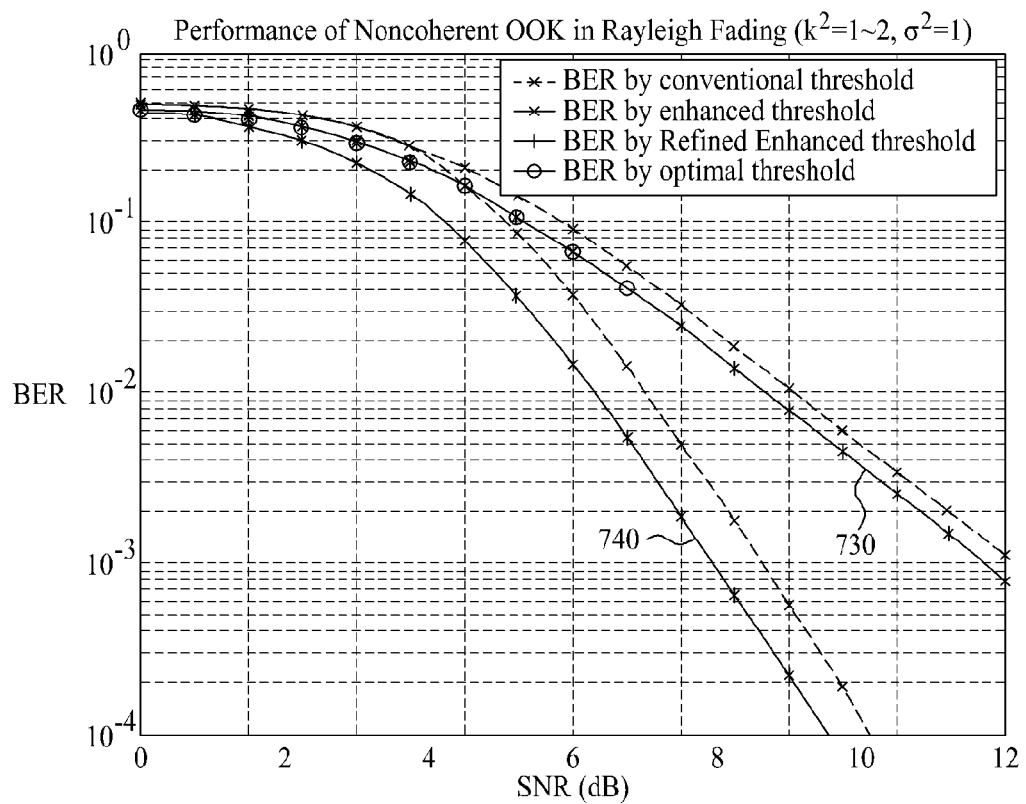

FIG. 7B illustrates a BER according to an SNR in a Rayleigh fading environment when $h_k$ corresponds to a complex Gaussian random variable that is independent and identically distributed with respect to k.

Referring to FIG. 7B, due to an increase in a diversity gain, an increase in performance of a system based on multiple receiving antennas when compared to a system based on a single receiving antenna, may be significant in comparison to the AWGN environment. A system that is illustrated by a curved line 740 and that is based on two receiving antennas using a provided enhanced threshold and refined enhanced threshold may obtain an SNR gain of about 4 dB at $10^{-3}$ BER in comparison to a system that is illustrated by a curved line 730 and that is based on a single receiving antenna using a conventional threshold.

Figure 8:
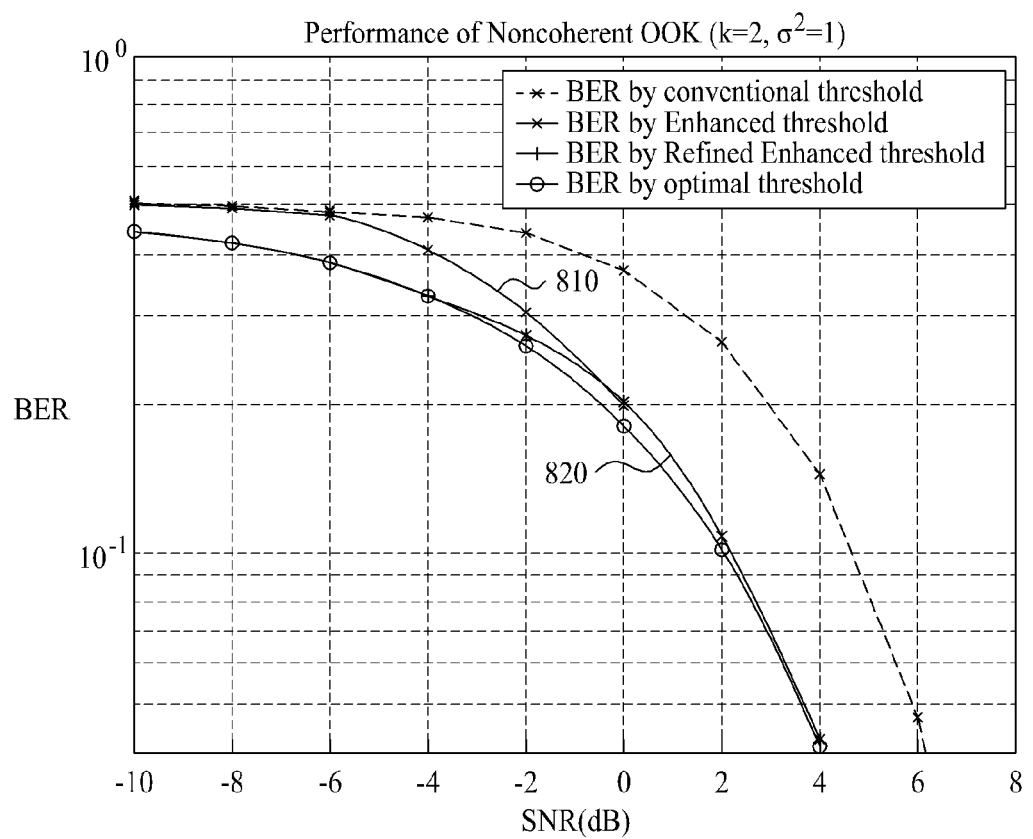
FIG. 8 is a graph illustrating an example of a BER in a low SNR region for each threshold determined.

FIG. 8 illustrates an example of a BER in a low SNR region for each threshold.

FIG. 8 illustrates a performance comparison when a number of receiving antennas corresponds to two in a low SNR region, corresponding to equal to or less than "0" dB, of an AWGN environment. In this example, a system parameter may be set to $\beta=1$. A curved line 820 that corresponds to a case of setting a refined enhanced threshold $\zeta_{ref}$ based on a low SNR region in addition to a high SNR region, illustrates a improved performance in the low SNR region in comparison to a curved line 810 that corresponds to a case of setting an enhanced threshold $\zeta$ based only on a high SNR region.

Figure 9A:
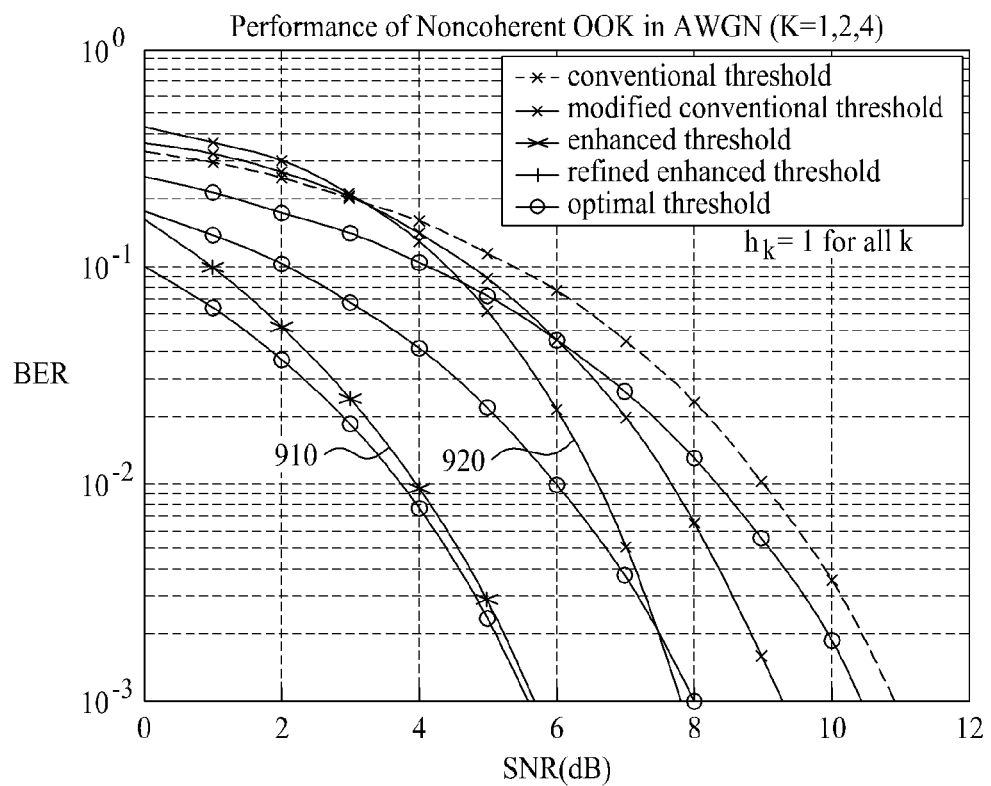
FIGS. 9A and 9B are graphs illustrating an example of a BER according to an SNR when a received signal is linear-processed.
Figure 9B:
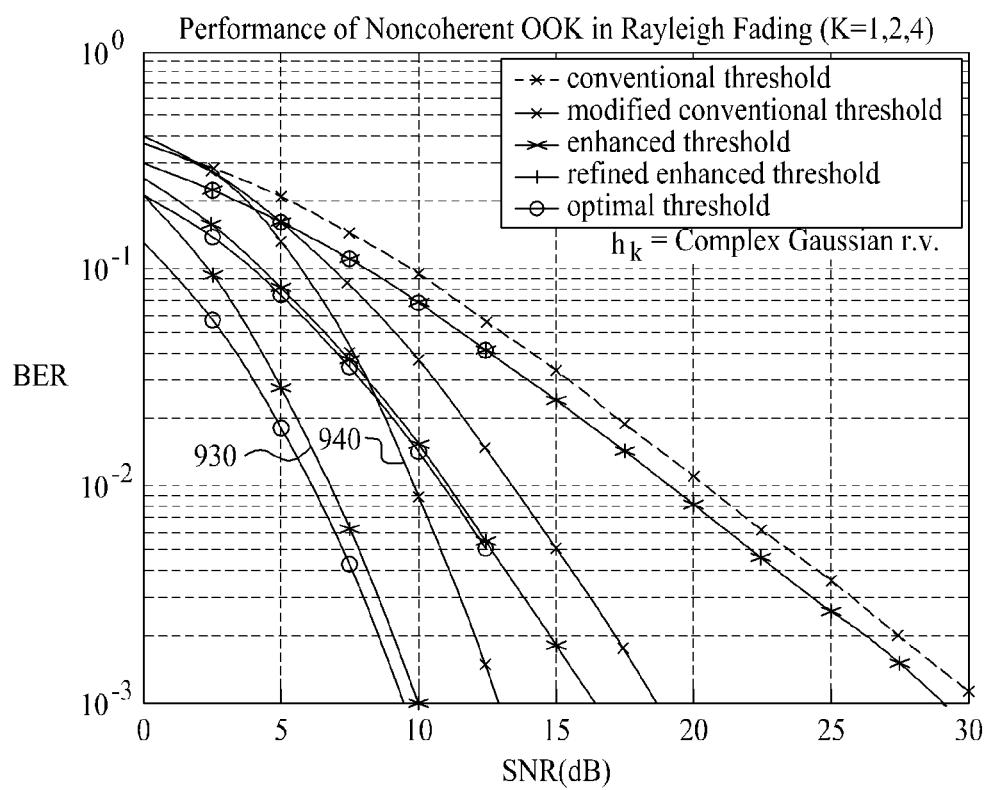

FIGS. 9A and 9B illustrate an example of a BER according to an SNR when a received signal is linearly-processed.

FIGS. 9A and 9B illustrate a BER when a linear process is performed with respect to a received signal in an AWGN and fading channel environment. FIG. 9A corresponds to an AWGN environment, and FIG. 9B corresponds to a Rayleigh fading environment. Curved lines are illustrated with respect to each of cases in which a number of receiving antennas corresponds to one, two, and four.

Referring to FIG. 9A, when a refined enhanced threshold that is illustrated by a curved line 910, is used at $10^{-3}$ BER with respect to four receiving antennas, an SNR gain of about 5.3 dB may be obtained in comparison to a threshold that is calculated based on a conventional scheme using a signal receiving antenna. When the refined enhanced threshold that is illustrated by the curved line 910, is used at $10^{-3}$ BER with respect to four receiving antennas, an SNR gain of about 2 dB may be obtained in comparison to a modified conventional threshold that is illustrated by a curved line 920, in which a scheme, applied to a conventional signal receiving antenna, is used and applied to multiple receiving antennas.

Referring to FIG. 9B, when a refined enhanced threshold that is illustrated by a curved line 930, is used at $10^{-3}$ BER with respect to four receiving antennas, an SNR gain of about 20.6 dB may be obtained in comparison to a threshold that is calculated based on a conventional scheme using a signal receiving antenna. When the refined enhanced threshold that is illustrated by the curved line 930, is used at $10^{-3}$ BER with respect to four receiving antennas, an SNR gain of about 2 dB may be obtained in comparison to a modified conventional threshold that is illustrated by a curved line 940, in which a scheme, applied to a conventional signal receiving antenna, is used and applied to multiple receiving antennas.

When a refined enhanced threshold is used, an SRN gain and diversity gain may increase as the number of receiving antennas increases, and as a channel environment becomes closer to a fading environment.

Figure 10A:
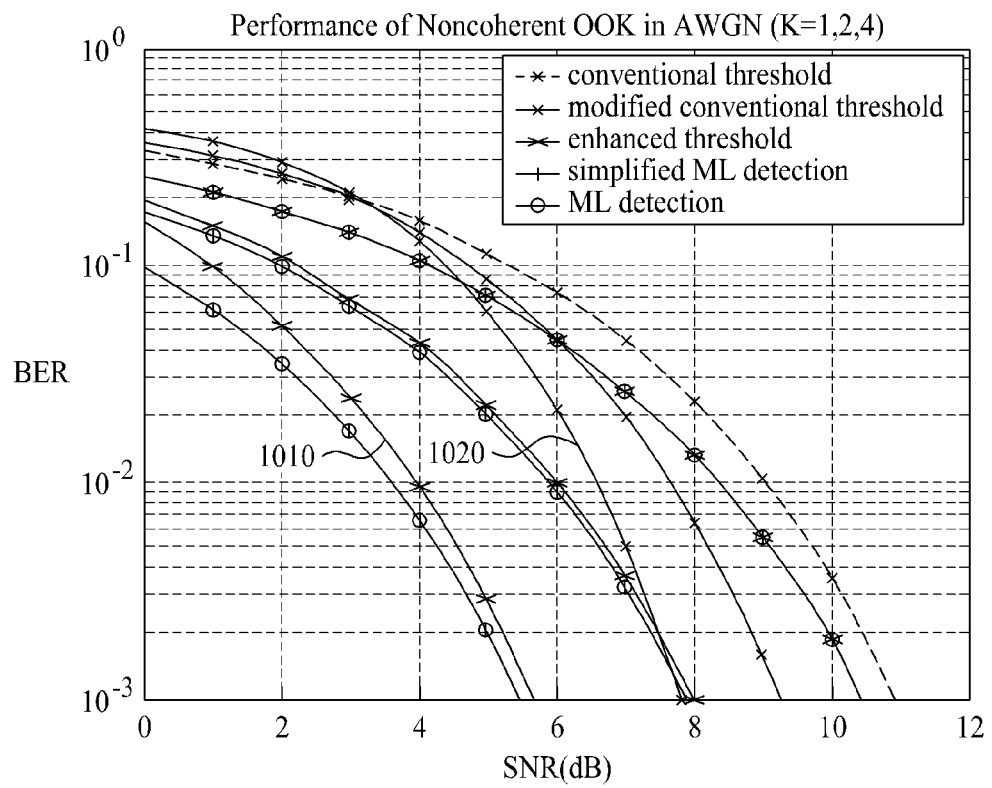
FIGS. 10A and 10B are graphs illustrating an example of a BER according to an SNR when a received signal is nonlinear-processed.
Figure 10B:
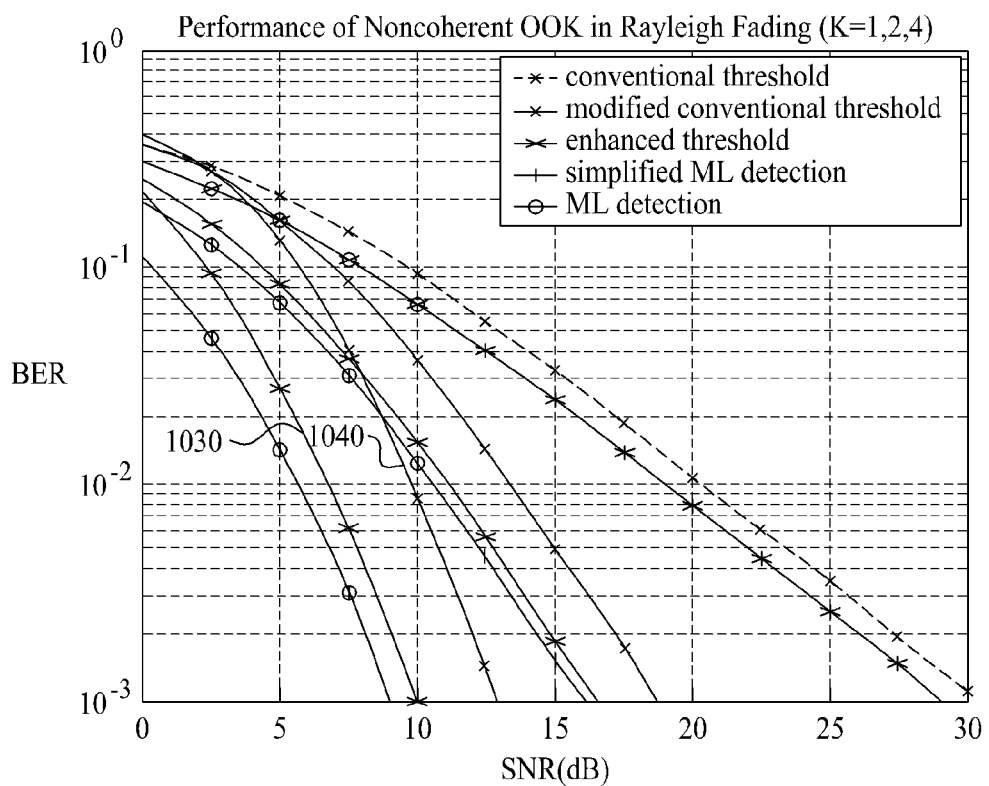

FIGS. 10A and 10B illustrate examples of a BER according to an SNR when a received signal is nonlinearly-processed.

FIGS. 10A and 10B illustrate a BER when a nonlinear process is performed with respect to a received signal in an AWGN and fading channel environment. FIG. 10A corresponds to an AWGN environment, and FIG. 10B corresponds to a Rayleigh fading environment. Curved lines are illustrated with respect to each case in which a number of receiving antennas corresponds to one, two, and four.

Referring to FIG. 10A, when a refined enhanced threshold that is illustrated by a curved line 1010, is used at $10^{-3}$ BER with respect to four receiving antennas, an SNR gain of about 5.325 dB may be obtained in comparison to a threshold that is calculated based on a conventional scheme using a signal receiving antenna. When the refined enhanced threshold that is illustrated by the curved line 1010, is used at $10^{-3}$ BER with respect to four receiving antennas, an SNR gain of about 2 dB may be obtained in comparison to a modified conventional threshold that is illustrated by a curved line 1020, in which a scheme, applied to a conventional signal receiving antenna, is used and applied to multiple receiving antennas.

Referring to FIG. 10B, when a refined enhanced threshold that is illustrated by a curved line 1030, is used at $10^{-3}$ BER with respect to four receiving antennas, an SNR gain of about 21.6 dB may be obtained in comparison to a threshold that is calculated based on a conventional scheme using a signal receiving antenna. When the refined enhanced threshold that is illustrated by the curved line 1030, is used at $10^{-3}$ BER with respect to four receiving antennas, an SNR gain of about 2 dB may be obtained in comparison to a modified conventional threshold that is illustrated by a curved line 1040, in which a scheme, applied to a conventional signal receiving antenna, is used and applied to multiple receiving antennas.

A simplified ML detection of FIGS. 10A and 10B in which a nonlinear process is performed may obtain more SNR gain, of as much as about 0.25 dB in an AWGN environment and 1 dB in a Rayleigh fading environment, at $10^{-3}$ BER with respect to four receiving antennas, in comparison to a case of FIG. 9A and FIG. 9B in which a linear process is performed with respect to a received signal.

FIG. 11 illustrates an example of a method of receiving a signal using multiple antennas.

In 1110, an apparatus for receiving a signal using multiple antennas receives a transmitted signal through K receiving antennas. The transmitted signal may be on-off keying modulated and transmitted.

In 1120, the apparatus detects envelopes with respect to each of the signals that are received through the K receiving antennas.

In 1130, the apparatus combines signals generated by performing a linear processing and a nonlinear processing with respect to each of the K detected envelopes. For example the apparatus may square each of the K detected envelopes, and combine the K squared signals into a single signal.

In this example, the apparatus may multiply each of the K detected envelopes by a linear parameter based on a size of the detected envelopes when a transmission bit corresponds to "1" and based on a mean value of squares of the detected envelopes when the transmission bit corresponds to "0". The apparatus may perform a logarithmic process with respect to each of the K detected envelopes. Thereafter, the apparatus may combine signals in which the linear parameter is multiplied and signals in which the logarithmic process is performed.

The apparatus may multiply each of the K detected envelopes by a linear parameter based on a size of the detected envelopes when a transmission bit corresponds to "1" and based on a mean value of squares of the detected envelopes when the transmission bit corresponds to "0". The apparatus may perform a logarithmic process with respect to each of signals in which the linear parameter is multiplied. Thereafter, the apparatus may combine signals in which the linear parameter is multiplied and signals in which the logarithmic process is performed.

In 1140, the apparatus compares the combined signal with a threshold that is determined based on a status of a channel through which the on-off keying modulated signals are transmitted, the K receiving antennas, and a system parameter.

For example, the apparatus may determine an optimal threshold based on the Rayleigh probability density function of the combined signal when a transmission bit corresponds to "0" and the Rician probability density function of the combined signal when the transmission bit corresponds to "1."

The apparatus may determine, as the optimal threshold, half of a magnitude of a signal component neglecting noise in the combined signal. The apparatus may determine the optimal threshold based on a high SNR region. The apparatus may determine the optimal threshold based on a low SNR region. The apparatus may determine a reference SNR for determining one of a threshold of a high SNR region and a threshold of a low SNR region.

When an SNR of the combined signal $r_{env,div}$ is greater than or equal to the reference SNR, the apparatus may determine the threshold of the high SNR region as the optimal threshold. When the SNR of the combined signal $r_{env,div}$ is less than the reference SNR, the apparatus may determine the threshold of the low SNR region as the optimal threshold.

In 1150, the apparatus determines a message value of the on-off keying modulated signals. The on-off keying modulated signals may correspond to signals that are transmitted at a transmission end, and may include a transmission bit. The apparatus of a signal reception using multiple antennas may estimate the transmission bit by comparing the combined signal with a threshold.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner to and/or replaced or supplemented by other components or their equivalents. Accordingly, other implementations are within the scope of the following claims.

What is claimed is:

1. An apparatus for receiving a signal using multiple antennas, the apparatus comprising:
a receiver to receive on-off keying modulated signals through K receiving antennas;
a detector to detect envelopes with respect to each of the signals that are received through the K receiving antennas;
a combiner to combine signals that are generated by performing a linear processing and a nonlinear processing on each of the K detected envelopes; and
a message determining unit to determine a message value of the on-off keying modulated signals by comparing the combined signals with a threshold that is determined based on a status of a channel through which the on-off keying modulated signals are transmitted, the K receiving antennas, and a system parameter,
wherein K is equal to or greater than 2.

2. The apparatus of claim 1, wherein the detector is configured to detect the envelopes based on a value that is generated by multiplying each of the signals received through the K receiving antennas by two orthogonal functions.

3. The apparatus of claim 1, wherein the combiner comprises:
 a first linear processing unit to square each of the K detected envelopes; and
 a second linear processing unit to combine the K squared signals, and to perform a square root process with respect to the combined signals.

4. The apparatus of claim 1, wherein the combiner comprises:
 a first linear processing unit to multiply each of the K detected envelopes by a linear parameter that is based on a size of the detected envelopes when a transmission bit corresponds to "1," and that is based on a mean value of squares of the detected envelopes when the transmission bit corresponds to "0";
 a nonlinear processing unit to perform a logarithmic process with respect to each of the K detected envelopes; and
 a second linear processing unit to combine signals in which the linear parameter is multiplied and signals in which the logarithmic process is performed.

5. The apparatus of claim 1, wherein the combiner comprises:
 a first linear processing unit to multiply each of the K detected envelopes by a linear parameter that is based on a size of the detected envelopes when a transmission bit corresponds to "1," and that is based on a mean value of squares of the detected envelopes when the transmission bit corresponds to "0";
 a nonlinear processing unit to perform a logarithmic process with respect to each of signals in which the linear parameter is multiplied; and
 a second linear processing unit to combine signals in which the linear parameter is multiplied and signals in which the logarithmic process is performed.

6. The apparatus of claim 1, wherein the message determining unit comprises:
 a threshold determining unit to determine an optimal threshold based on a Rayleigh probability density function of the combined signal when a transmission bit corresponds to "0," and based on a Rician probability density function of the combined signal when the transmission bit corresponds to "1"; and
 a transmission bit estimating unit to estimate a transmission bit by comparing the combined signal with the optimal threshold.

7. The apparatus of claim 6, wherein the threshold determining unit is configured to determine the optimal threshold based on a high signal to noise ratio (SNR) region.

8. The apparatus of claim 7, wherein the threshold determining unit is configured to determine the optimal threshold based on a low SNR region.

9. The apparatus of claim 6, wherein the threshold determining unit is configured to determine a reference SNR for determining one of a threshold of a high SNR region and a threshold of a low SNR region.

10. The apparatus of claim 9, wherein:
 the threshold determining unit is configured to determine the threshold of the high SNR region as the optimal threshold when an SNR of the combined signal is greater than or equal to the reference SNR, and
 the threshold determining unit is configured to determine the threshold of the low SNR region as the optimal threshold when the SNR of the combined signal is less than the reference SNR.

11. A method of receiving a signal using multiple antennas, the method comprising:
 receiving on-off keying modulated signals through K receiving antennas;
 detecting envelopes with respect to each of the signals received through the K receiving antennas;
 combining signals generated by performing a linear processing and a nonlinear processing with respect to each of the K detected envelopes; and
 determining a message value of the on-off keying modulated signals by comparing a combined signal with a threshold that is determined based the K receiving antennas, a system parameter, and a status of a channel through which the on-off keying modulated signals are transmitted,
 wherein K is equal to or greater than 2.

12. The method of claim 11, wherein the combining comprises:
 squaring each of the K detected envelopes; and
 combining the K squared signals into a single signal.

13. The method of claim 11, wherein the combining comprises:
 multiplying each of the K detected envelopes by a linear parameter that is based on a size of the detected envelopes when a transmission bit corresponds to "1," and that is based on a mean value of squares of the detected envelopes when the transmission bit corresponds to "0";
 performing a logarithmic process with respect to each of the K detected envelopes; and
 combining signals in which the linear parameter is multiplied and signals in which the logarithmic process is performed.

14. The method of claim 11, wherein the combining comprises:
 multiplying each of the K detected envelopes by a linear parameter that is based on a size of the detected envelopes when a transmission bit corresponds to "1," and that is based on a mean value of squares of the detected envelopes when the transmission bit corresponds to "0";
 performing a logarithmic process with respect to each of signals in which the linear parameter is multiplied; and
 combining signals in which the linear parameter is multiplied and signals in which the logarithmic process is performed.

15. The method of claim 11, wherein the determining comprises:
 determining an optimal threshold based on a Rayleigh probability density function of the combined signal when a transmission bit corresponds to "0" and based on a Rician probability density function of the combined signal when the transmission bit corresponds to "1"; and
 estimating a transmission bit by comparing the combined signal with the optimal threshold.

16. The method of claim 15, wherein the determining of the threshold comprises determining, as the optimal threshold, half of a magnitude of a signal component neglecting noise in the combined signal.

17. The method of claim 15, wherein the determining of the threshold comprises determining the optimal threshold based on a high signal to noise ratio (SNR) region.

18. The method of claim 17, wherein the determining of the threshold comprises determining the optimal threshold based on a low SNR region.

19. The method of claim 15, wherein the determining of the threshold comprises determining a reference SNR for determining one of a threshold of a high SNR region and a threshold of a low SNR region.

20. The method of claim 19, wherein:
when an SNR of the combined signal is greater than or equal to the reference SNR, the determining of the threshold comprises determining the threshold of the high SNR region as the optimal threshold, and
when the SNR of the combined signal is less than the reference SNR, the determining of the threshold comprises determining the threshold of the low SNR region as the optimal threshold.

21. A terminal comprising K antennas each for receiving a signal, the terminal comprising:
a detector to detect envelopes of K signals that are received through each of the K receiving antennas;
a combiner to combine each of the K signals by performing a linear processing and a nonlinear processing on each of the K detected envelopes; and
a message determining unit to determine a message value of the on-off keying modulated signals based on the combined signals,
wherein K is equal to or greater than 2.

* * * * *